3,706,777
PROCESS FOR THE PRODUCTION OF ALKYL SILANES
Claus-Dietrich Seiler, Schulster, and Hans-Joachim Vahlensieck, Hagiken, Germany, assignors to Dynamit Nobel AG, Troisdorf, Germany
No Drawing. Filed Feb. 10, 1971, Ser. No. 114,393
Claims priority, application Germany, Mar. 14, 1970, P 20 12 229.6
Int. Cl. C07f 7/08
U.S. Cl. 260—448.2 E                                   7 Claims

ABSTRACT OF THE DISCLOSURE

Improvements in the reaction of olefinic hydrocarbons with hydrogen silanes in the presence of an in contact with platinum or palladium catalyst where the catalyst is disposed above the reaction mixture below a cooling system and where condensate from the cooling system is sprinkled onto the catalyst.

---

This invention relates to the production of alkyl silanes. It more particularly refers to a novel reaction procedure for said production.

It is in the prior art to form alkyl silanes by reacting hydrogen silanes with hydrocarbon compounds containing olefinic double bonds in the the presence of platinum compounds or metallic platinum which can be used alone or as a coating or impregnation applied to various supports. Such processes are, for example, described in U.S. Pats. 2,637,738, 2,632,013, German Pats. 1,169,936, 1,069,148 and 1,165,028, and German Green Pats. 1,156,- 013 and 1,210,844.

From the examples and descriptions given in the above-cited patents it can be seen that the catalytic reactions are always carried out so that the catalyst is added to a liquid form mixture of the reactants. This is true both in the case of reactions conducted under normal atmospheric pressure and in the case of reactions conducted under elevated pressure.

When platinum compounds in the form of platinum (IV) salts or platinum (IV) complex compounds are added, there is the danger with each batch that the reaction initiation may occur tardily, and then, when it does initiate, set in with such great violence that it can be controlled on a technical scale only at great expense. The platinum compounds used in this reaction usually are not re-usable after the distillative separation of the reaction product.

When platinum is used in supports, such as $\gamma$-$Al_2O_3$, asbestos or active charcoal, a considerable diminution of activity is also usually observed after as little as 10 to 20 hours of use. Even the use of very pure starting materials, which can be prepared only at considerable technical expense, seldom permits any longer effective use of the free platinum or supported platinum catalysts.

Improvements have now surprisingly been found in the process for the production of compounds with carbon-silicon bonds, which process comprises the reaction of compounds containing the silicon-hydrogen bond with olefinically unsaturated hydrocarbons or compounds which contain organo groups in addition to unsaturated hydrocarbon bonds, in the presence of support material containing platinum or pallidium as catalyst, by known methods, which improvement is characterized by the fact that the catalyst is impregnated on a support material which catalyst is disposed above the mixture of reactants, between the mixture and a cooling apparatus, and is sprinkled with the condensate from the cooling apparatus.

By the use of this process it is possible substantially to shorten the reaction time per batch, and furthermore to keep the activity of the catalyst substantially constant over a substantially longer time and through a greater number of batches.

In performing the process of the invention it is desirable to proceed by placing the supported catalyst into an appropriately constructed vessel that can be heated or cooled if desired. The catalyst in this vessel is in the form of a bed of an appropriate depth. The reactants are disposed beneath the catalyst bed in the heatable vessel.

The cooling system above the catalyst bed is preferably a condenser designed with a large surface area, which is constructed in such a manner that the returning condensate wets the entire catalyst surface as uniformly as possible. This can also be achieved, if desired, by the additional installation of known systems such as liquid distributing trays, sprinkler trays, and the like. The cooling system is cooled with known coolants, such as water, a chilled salt solution or Dry Ice dissolved in a solvent if desired, depending upon the boiling points of the reactants.

The process of the invention can be performed either at normal pressure or at elevated or reduced pressures. The end of the reaction can be detected by the fact that the reaction mixture boils at constant temperature.

By the process of the invention, compounds having at least one Si—H bond and compounds having olefinic double bonds are brought to reaction. The compounds containing a Si—H bond can be characterized by the general formula $H_nSiR_{4-n}$, $n$ being able to assume the values 1 to 3, and R representing an alkyl, alkoxy, aryl, alkenyl, aroxy or cycloalkyl moiety, or halogen.

Trichlorosilane and dichlorosilanes can be cited as halogen silanes which can be reacted according to the invention. Examples of pure arylsilanes and alkylsilanes are trimethylhydrogensilane, diethyldihydrogensilane, triethylhydrogensilane, dibutylsilane, diphenyldihydrogensilane and phenyltrihydrogensilane. Examples of alkoxysilanes are trimethoxy- and dimethoxyhydrogensilane and triethoxy- and diethoxyhydrogensilane, and an example of aroxysilane is triphenoxysilane.

However, hydrogen silane having various substituents are preferentially reacted according to the invention, one of the substituents being chlorine; examples are vinylhydrogendichlorosilane, methyl- and ethylhydrogendichlorosilane or phenylhydrogendichlorosilane.

Olefinically unsaturated hydrocarbons are used as the second reaction component according to the invention, or compounds which contain organo groups in addition to unsaturated hydrocarbon bonds. Ethylene and propylene are preferentially suitable as olefins, although pentene-1, octene-1, allylbenzene and styrene can be used as reaction components. The double bond does not have to be a terminal one; for example, heptene-3 can also be used according to the invention.

Chlorinated olefins, such as vinyl chloride, 1,1-difluoroethylene, 1,1,1-trifluoropropylene, or cyclic, unsaturated hydrocarbons such as cyclohexene, can also be used as starting compounds.

By compounds containing organo groups in addition to unsaturated hydrocarbon bonds are meant those compounds which have a terminal double bond and which have an additional functional group separated from the double bond by at least one $CH_2$ group, which may be alkyl substituted if desired, examples being the alkenyl chlorides or alkenyl esters, such as allyl chloride, 3-chlorobutene-1 or allylacrylate or methacrylate.

If one of the reactants decomposes at elevated temperatures or tends to polymerize, as in the case for example, of allylacrylate or styrene, the reaction is preferably performed at less than atmospheric pressure or in a solvent such as tetrahydrofuran.

The advantage of the process of the invention over the prior art processes consists in the following:

(1) The catalyst comes in contact only with vaporous products or condensates thereof, and thus all possibility of contamination is prevented; and (2) The reaction time is shortened because the reaction products formed on the catalyst surface are continuously washed downward by condensate formed in the cooling system by the unreacted starting products.

The process of the invention will be demonstrated by the following examples.

EXAMPLE 1a

A 2-liter three-necked flask is placed in a heating oven. Onto the middle neck of the three-necked flask there is placed a glass tube (inside diameter about 4.5 cm.) about 20 cm. long, to whose one side there is welded a female ground glass connector and to whose other side is welded a male ground glass connector. Above the ground glass male connector a glass grid is fused into the interior of the tube, the catalyst resting on this grid. The grid prevents the catalyst from dropping into the flask beneath it. A high-intensity condenser is placed on the tube containing the catalyst. The system is sealed off from the outside by flooding with nitrogen.

150 ml. of active charcoal containing 0.01% platinum per liter of bulk volume (grain size 1.0 to 2.0 mm., bulk weight 450 g./l.) is poured into the glass tube provided for the reception of the catalyst. The flask is charged with 4.4 moles of trichlorosilane and 4.0 moles of allyl chloride. The condenser is supplied with a refrigerant solution of a temperature of −32° C. By gently heating the flask, the catalyst is exposed to a rising current consisting of trichlorosilane and allylchloride vapor, while it is sprinkled from above with unreacted trichlorosilane and allylchloride that has condensed on the surface of the condenser.

After a constant sump temperature (about 80 to 90° C.) has been reached, the flask is emptied and filled afresh with the same amounts of the reactants. The catalyst, however, was not replaced. In all, fifty batches were processed in this manner with the same catalysts; the results are summarized in the following table.

| | Amount of— | | |
|---|---|---|---|
| Catalyst used (ml. active charcoal) | Allyl chloride used (moles) | Trichloro-silane used (moles) | Time required to reach constant sump temp. (hr.) |
| Batch No.: | | | |
| 1 | 150 | 4.0 | 4.4 | 18 |
| 2 | 150 | 4.0 | 4.4 | 18 |
| 3 | 150 | 4.0 | 4.4 | 21 |
| 4 | 150 | 4.0 | 4.4 | 14 |
| 5 | 150 | 4.0 | 4.4 | 14 |
| 6 | 150 | 4.0 | 4.4 | 14 |
| 7 | 150 | 4.0 | 4.4 | 19 |
| 8 | 150 | 4.0 | 4.4 | 14 |
| 9 | 150 | 4.0 | 4.4 | 19 |
| 10 | 150 | 4.0 | 4.4 | 17 |
| 11 | 150 | 4.0 | 4.4 | 18 |
| 12 | 150 | 4.0 | 4.4 | 18 |
| 13 | 150 | 4.0 | 4.4 | 17 |
| 14 | 150 | 4.0 | 4.4 | 26 |
| 15 | 150 | 4.0 | 4.4 | 19 |
| 16 | 150 | 4.0 | 4.4 | 17 |
| 17 | 150 | 4.0 | 4.4 | 26 |
| 18 | 150 | 4.0 | 4.4 | 16 |
| 19 | 150 | 4.0 | 4.4 | 14 |
| 20 | 150 | 4.0 | 4.4 | 16 |
| 21 | 150 | 4.0 | 4.4 | 17 |
| 22 | 150 | 4.0 | 4.4 | 18 |
| 23 | 150 | 4.0 | 4.4 | 17 |
| 24 | 150 | 4.0 | 4.4 | 18 |
| 25 | 150 | 4.0 | 4.4 | 21 |
| 26 | 150 | 4.0 | 4.4 | 22 |
| 27 | 150 | 4.0 | 4.4 | 26 |
| 28 | 150 | 4.0 | 4.4 | 27 |
| 29 | 150 | 4.0 | 4.4 | 27 |
| 30 | 150 | 4.0 | 4.4 | 27 |
| 48 | 150 | 4.0 | 4.4 | 68 |

EXAMPLE 1b (For purposes of comparison)

150 ml. of active charcoal (grain size 1.0 to 2.0 mm., bulk weight 450 g./l.), containing 0.01% platinum per liter of bulk volume, was added to 4.0 moles of allyl chloride and 4.4 moles of trichlorosilane in a round flask equipped with a reflux condenser. The mixture of catalyst and liquid was then refluxed until the sump temperature had reached a constant value.

After decanting the reaction solution from the carbon-platinum catalyst, the test was repeated with the same quantity of starting components, using the original catalyst. The results achieved are listed in the following table:

| | Amount of— | | | |
|---|---|---|---|---|
| | Catalyst (ml. active charcoal, platinum content 0.01%) | Allyl chloride used (moles) | Trichloro-silane used (moles) | Time required to reach constant temp. (hr.) |
| Batch No.: | | | | |
| 1 | 150 | 4.0 | 4.4 | 48 |
| 2 | 150 | 4.0 | 4.4 | 100 |
| 3 | 150 | 4.0 | 4.4 | |

Even when the catalyst is used the second time, the required reaction time doubles. In the third batch, no start-up of the reaction is observed. The addition of complexing agents to the mixture of the reactants results in no lengthening of the lift of the catalyst.

This example shows that by operating according to the method of the invention considerably more batches can be processed with the same catalyst, and that the reaction time in the process of the invention is considerably faster. In the process of the invention (Example 1a) it was not until after about 25 to 30 batches that a certain diminution occurred in the activity of the catalyst.

EXAMPLE 2

Instead of trichlorosilane, trimethoxysilane is used in the same apparatus described under Example 1a. The results achieved parallel those obtained in Example 1a.

What is claimed is:

1. In the process of producing alkyl silanes by the reaction of an olefinic hydrocarbon with a hydrogen silane at elevated temperatures in contact with a platinum or palladium catalyst; the improvement which comprises disposing said catalyst impregnated on a carrier between said reactants and a condensing means for said reaction and effecting said reaction by permitting the reactants and reaction product to come in contact with said catalyst, to pass through said catalyst and to condense onto said catalyst.

2. The improved process claimed in claim 1 wherein said reaction is carried out under reflux conditions and wherein condensate from said condensing means is sprinkled on said catalyst.

3. The improved process claimed in claim 1 wherein said catalyst is substantially uniformly wetted with condensate.

4. The improved process claimed in claim 1 carried out at atmospheric pressure.

5. The improved process claimed in claim 1 carried out at sub-atmospheric pressure.

6. The improved process claimed in claim 1 wherein said silane has the formula $$H_nSiR_{4-n}$$

wherein $n$ is 1 to 3 and R is a member selected from the group consisting of alkoxy, alkyl, aryl, alkenyl, aralkyl, aryloxy, cycloalkyl and halo.

7. The improved process claimed in claim 6 wherein said alkyl group has up to 8 carbon atoms, said alkoxy group has up to 8 carbon atoms, said alkenyl has up to 8 carbon atoms, said aryl is monocyclic, said cycloalkyl group has about 5 to 7 carbon atoms, said halo is chloro, bromo or fluoro, said aryloxy is monocyclic and said aralkyl is monocyclic and the alkyl portion thereof has up to 6 carbon atoms.

References Cited

UNITED STATES PATENTS

| | | | |
|---|---|---|---|
| 2,721,873 | 10/1955 | MacKenzie et al. | 260—448.2 E |
| 2,823,218 | 2/1958 | Speier et al. | 260—448.2 E |
| 2,851,473 | 9/1958 | Wagner et al. | 260—448.2 E |
| 2,970,150 | 1/1961 | Bailey | 260—448.2 E X |
| 3,198,766 | 8/1965 | Nitzsche et al. | 260—448.2 E X |
| 3,220,972 | 11/1965 | Lamoreaux | 260—448.2 E X |
| 3,624,119 | 11/1971 | Strotzbach et al. | 260—448.2 E |

JAMES E. POER, Primary Examiner

P. F. SHAVER, Assistant Examiner

U.S. Cl. X.R.

260—448.8 R

UNITED STATES PATENT OFFICE
CERTIFICATE OF CORRECTION

Patent No. 3,706,777         Dated  December 19, 1972

Inventor(s) Claus-Dietrich Seiler et al

It is certified that error appears in the above-identified patent and that said Letters Patent are hereby corrected as shown below:

Column 1, line 5, "Hagiken" should read -- Habiken -- .

Signed and sealed this 29th day of May 1973.

(SEAL)
Attest:

EDWARD M. FLETCHER, JR.　　　　　　ROBERT GOTTSCHALK
Attesting Officer　　　　　　　　　Commissioner of Patents

PO-1050
(5/69)

UNITED STATES PATENT OFFICE
CERTIFICATE OF CORRECTION

Patent No. 3 706 777      Dated December 19, 1972

Inventor(s) Claus-Dietrich Seiler et al

It is certified that error appears in the above-identified patent and that said Letters Patent are hereby corrected as shown below:

Column 1, line 4, "Schulster" should read --Rheinfelden-- line 5, "Hagiken" should read -- Wehr --.

This certificate supersedes the Certificate of Correction issued May 29, 1973.

Signed and sealed this 9th day of April 1974.

(SEAL)
Attest:

EDWARD M. FLETCHER, JR.
Attesting Officer

C. MARSHALL DANN
Commissioner of Patents